UNITED STATES PATENT OFFICE 2,640,061

PROCESS FOR THE PREPARATION OF 1-AMINO-2-ALKYL-MERCAPTO-4 HYDROXY-ANTHRAQUINONES

George W. Seymour, Maplewood, and Victor S. Salvin, Irvington, N. J., assignors to Celanese Corporation of America, New York, N. Y., a corporation of Delaware No Drawing. Original application May 7, 1947, Serial No. 746,634. Divided and this application July 29, 1952, Serial No. 301,606

1 Claim. (Cl. 260—380)

This invention relates to novel anthraquinone dyestuffs and relates more particularly to certain mercapto-anthraquinone dyestuffs of excellent fastness properties.

An important object of this invention is the production of improved anthraquinone dyestuffs dyeing cellulose acetate or other organic derivative of cellulose textile materials in desirable red shades fast to light, washing and acid-fading.

Other objects of this invention will appear from the following detailed description.

This application is a division of U. S. application Serial No. 746,634, filed May 7, 1947.

Various azo and anthraquinone dyestuffs dyeing cellulose acetate or other organic derivative of cellulose textile materials in desirable red shades are available. The red dyestuffs which are of azo structure are fairly satisfactory with respect to their resistance to acid-fading but their light fastness leaves much to be desired. On the other hand, the available red dyestuffs of anthraquinone structure while exhibiting excellent light fastness are rather poor with respect to their resistance to acid-fading. The preparation of dyestuffs which are suitable for dyeing cellulose acetate or other organic derivative of cellulose textile materials in red shades resistant both to acid-fading and to light as well as to other agencies normally having a deleterious effect on said dyed materials constitutes a distinct advance in the art.

We have now found that anthraquinone dyestuffs of the following general formula

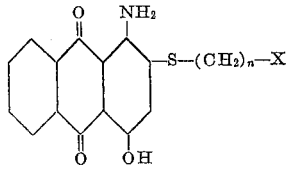

wherein $n$ is a whole number and X is either a hydrogen or hydroxy radical, exhibit an unusual degree of affinity for cellulose acetate or other organic derivative of cellulose textile materials and dye such materials in valuable red shades which are of excellent resistance to light, washing and acid-fading. In addition, said dyestuffs may also be employed as pigments and excellent results may be obtained when incorporated in the cellulose acetate dope or spinning solution and the latter then spun or shaped into filaments or other materials.

Our novel dyestuffs may be obtained by reacting 1-amino-2,4-dibrom-anthraquinone with a mixture of boric acid and sulfuric acid to form 1-amino-2-brom-4-hydroxy-anthraquinone, and reacting the latter with sodium disulfide so that 1-amino-2-mercapto-4-hydroxy-anthraquinone is obtained. This 1-amino-2-mercapto-4-hydroxy-anthraquinone intermediate may then be reacted under reflux in an alkaline medium with a chlorhydrin as, for example, ethylene chlorhydrin, 1,3-propylene chlorhydrin, 1,4-butylene chlorhydrin, 1,8-octamethylene chlorhydrin or 1,12-dodecamethylene chlorohydrin or with a suitable alkyl halide such as methyl iodide, butyl bromide or lauryl chloride, or with dimethyl sulfate, to form the desired substituted mercapto dyestuffs. We may thus obtain anthraquinone dyestuffs such as, for example, 1-amino-2-methyl-mercapto-4-hydroxy-anthraquinone, 1-amino-2-hydroxyethyl-mercapto-4-hydroxy-anthraquinone, 1-amino-2-hydroxypropyl-mercapto-4-hydroxy-anthraquinone, 1-amino-2-hydroxybutyl-mercapto-4-hydroxy-anthraquinone, 1-amino-2-hydroxyoctyl-mercapto-4-hydroxy-anthraquinone, 1-amino-2-hydoxylauryl-mercapto-4-hydroxy-anthraquinone or 1-amino-2-lauryl-mercapto-4-hydroxy-anthraquinone. Suitable alkaline agents which may be employed for rendering the reaction medium alkaline are, for example, sodium hydroxide, sodium bicarbonate, magnesium hydroxide, or sodium carbonate.

In order further to illustrate our invention, but without being limited thereto, the following examples are given:

Example I 30 parts by weight of 1-amino-2,4-dibrom-anthraquinone are dissolved in 200 parts by weight of concentrated sulfuric acid and 20 parts by weight of boric acid are added thereto. The solution obtained is heated with stirring for 8 hours at 150° C. During the reaction, hydrogen bromide and some free bromine are evolved. The reaction mixture obtained is cooled, dropped on to ice and 1-amino-2-brom-4-hydroxy-anthraquinone precipitates out as a red solid. The latter is filtered off and then washed free of acid.

A mixture of about 160 parts by weight of ethyl alcohol, 10 parts by weight of sulfur and 28 parts by weight of crystalline sodium sulfide are heated together until complete solution is obtained and then 20 parts by weight of 1-amino-2-brom-4-hydroxy-anthraquinone are added. The reaction mixture is maintained under reflux for 6 hours during which time the color changes from a wine to a violet. After heating is completed the reaction mixture is acidified with dilute hydrochloric acid and the 1-amino-2-mercapto- 4-hydroxy-anthraquinone present precipitates together with sulfur. The precipitate is filtered from solution and the crude press cake obtained resludged in 500 parts by weight of 1% aqueous sodium hydroxide solution. The anthraquinone compound passes into solution and the insoluble residual sulfur may be removed by a second filtration. The alkaline filtrate of 1-amino-2-mercapto-4-hydroxy-anthraquinone is then refluxed with about 30 parts by weight of ethylene chlorhydrin. Reaction takes place rapidly and after one hour a red suspension of 1-amino-2-hydroxyethyl-mercapto-4-hydroxy-anthraquinone is obtained. After filtration, the dyestuff is obtained in the form of a brown press cake. A yield of about 73% of theoretical based on the 1-amino-2-brom-4-hydroxy-anthraquinone is obtained. The dyestuff 1 - amino-2-hydroxyethyl - mercapto-4-hydroxy-anthraquinone dyes cellulose acetate materials in attractive red shades and exhibits an excellent degree of affinity for said materials. The dyed cellulose acetate materials may be exposed to ultra-violet light for 50 hours without fading and exhibit a resistance to acid fading of 1.8 units in accordance with the standard A. A. T. C. C. acid-fading test.

*Example II*

To 300 parts by weight of an alkaline solution of 1 - amino-2-mercapto-4-hydroxy - anthraquinone containing 8 parts by weight of the latter are added 13.25 parts by weight of dimethyl sulfate and 5 parts by weight of caustic soda. The reaction mixture is held at 80° C. for 3 hours. The 1-amino-2-methylmercapto-4-hydroxy - anthraquinone which precipitates is filtered off and washed. A yield of 62% of the theoretical is obtained. The dyestuff 1-amino-2-methylmercapto-4-hydroxy-anthraquinone dyes cellulose acetate materials in red shades with good affinity. The dyed cellulose acetate materials may be exposed to ultra-violet light for 50 hours without noticeable fading and exhibit a resistance to acid-fading of 1.8 units in accordance with the standard A. A. T. C. C. acid-fading test.

*Example III*

To 200 parts by weight of an alkaline solution of 1-amino-2-mercapto-4-hydroxy - anthraquinone prepared and isolated as in Example I and containing 8 parts by weight of intermediate are added 80 parts by weight of ethyl alcohol and 20 parts by weight of lauryl chloride. The mixture is held under reflux at 85° C. for 2 hours, whence the formation of 1-amino-2-lauryl-mercapto-4-hydroxy-anthraquinone is complete. The dyestuff is isolated by filtration and may be recrystallized from alcohol. The 1-amino-2-lauryl-mercapto-4-hydroxy-anthraquinone dyes cellulose acetate in red shades. The dyed acetate material does not noticeably change after exposure to ultra-violet light for 50 hours and it exhibits a resistance to acid-fading of 2.0 units in accordance with the standard A. A. T. C. C. acid-fading test.

While our invention has been more particularly described in connection with the dyeing of cellulose acetate materials, textile materials having a basis of other organic derivatives of cellulose may be dyed with our novel dyestuffs as well. Examples of other organic derivatives of cellulose are cellulose esters such as cellulose propionate, cellulose butyrate, cellulose acetate-propionate, cellulose acetate-butyrate as well as cellulose ethers such as ethyl cellulose and benzyl cellulose.

It is to be understood that the foregoing detailed description is given merely by way of illustration and that many variations may be made therein without departing from the spirit of our invention.

Having described our invention, what we desire to secure by Letters Patent is:

Process for the production of 1-amino-2-methyl-mercapto - 4 - hydroxy-anthraquinone which comprises reacting 1-amino-2-mercapto-4-hydroxy-anthraquinone under reflux in an aqueous alkaline medium with dimethyl sulfate.

GEORGE W. SEYMOUR.
VICTOR S. SALVIN.

References Cited in the file of this patent

UNITED STATES PATENTS

| Number | Name | Date |
| --- | --- | --- |
| 1,964,971 | Albrecht et al. | July 3, 1934 |
| 2,081,755 | Lodge | May 25, 1937 |

OTHER REFERENCES

Lowy et al.—Introduction to Organic Chemistry, 6th edition, pages 213-14 (1946), John Wiley & Sons, New York city.